US012353150B2

(12) United States Patent
Yoshinaga et al.

(10) Patent No.: US 12,353,150 B2
(45) Date of Patent: Jul. 8, 2025

(54) FIXING DEVICE AND IMAGE FORMING APPARATUS

(71) Applicants: Hiroshi Yoshinaga, Chiba (JP); Yoshiki Yamaguchi, Kanagawa (JP); Takashi Seto, Kanagawa (JP); Ryohei Matsuda, Kanagawa (JP); Ryohhei Sugiyama, Kanagawa (JP)

(72) Inventors: Hiroshi Yoshinaga, Chiba (JP); Yoshiki Yamaguchi, Kanagawa (JP); Takashi Seto, Kanagawa (JP); Ryohei Matsuda, Kanagawa (JP); Ryohhei Sugiyama, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 18/510,632

(22) Filed: Nov. 15, 2023

(65) Prior Publication Data

US 2024/0176268 A1 May 30, 2024

(30) Foreign Application Priority Data

Nov. 24, 2022 (JP) ................................ 2022-187046

(51) Int. Cl.
*G03G 15/20* (2006.01)

(52) U.S. Cl.
CPC ..... *G03G 15/2053* (2013.01); *G03G 15/2064* (2013.01); *G03G 2215/2029* (2013.01)

(58) Field of Classification Search
CPC .......... G03G 15/2053; G03G 15/2064; G03G 2215/2029; G03G 15/2017
See application file for complete search history.

(56) References Cited

U.S. PATENT DOCUMENTS

2013/0084111 A1* 4/2013 Iwata ................ G03G 15/2053 399/329
2014/0356038 A1 12/2014 Arai et al.
(Continued)

FOREIGN PATENT DOCUMENTS

JP 2014-235308 A 12/2014
JP 2015-194633 A 11/2015
JP 2019-015943 A 1/2019

OTHER PUBLICATIONS

U.S. Appl. No. 18/207,153, filed Jun. 8, 2023.

*Primary Examiner* — Sandra Brase
(74) *Attorney, Agent, or Firm* — XSENSUS LLP

(57) ABSTRACT

A fixing device includes a fixing member, a pressing member, a heat source, and a reflecting member. The pressing member presses and contacts an outer circumferential surface of the fixing member. The heat source is disposed inside a loop of the fixing member. The reflecting member includes a reflecting portion, a pressure receiving portion, and an extending portion. The reflecting portion reflects heat toward an inner circumferential surface of the fixing member. The pressure receiving portion receives a pressing force of the pressing member via the fixing member. The extending portion extends from an area upstream to an area downstream from the nip portion in a direction of rotation of the fixing member and facing the inner circumferential surface of the fixing member. The reflecting member is in non-contact with one or more of members disposed inside the loop of the fixing member, at least when the fixing member rotates.

10 Claims, 10 Drawing Sheets

(56) References Cited

U.S. PATENT DOCUMENTS

| | | | | |
|---|---|---|---|---|
| 2015/0063883 | A1* | 3/2015 | Nakano .............. | G03G 15/2053 399/329 |
| 2015/0093165 | A1* | 4/2015 | Kondo .............. | G03G 15/2053 399/329 |
| 2017/0160684 | A1* | 6/2017 | Zhang ................ | G03G 15/2053 |
| 2023/0229104 | A1 | 7/2023 | Yamaguchi | |
| 2023/0297010 | A1 | 9/2023 | Daisuke et al. | |
| 2023/0297011 | A1 | 9/2023 | Shiodera et al. | |
| 2023/0297015 | A1 | 9/2023 | Yoshinaga et al. | |
| 2023/0297026 | A1 | 9/2023 | Andoh et al. | |
| 2023/0300269 | A1 | 9/2023 | Andoh et al. | |
| 2023/0305451 | A1 | 9/2023 | Sugiyama et al. | |
| 2023/0324838 | A1 | 10/2023 | Samei et al. | |
| 2023/0350329 | A1 | 11/2023 | Kabata et al. | |

* cited by examiner

FIXING DEVICE AND IMAGE FORMING APPARATUS

CROSS-REFERENCE TO RELATED APPLICATION

This patent application is based on and claims priority pursuant to 35 U.S.C. § 119(a) to Japanese Patent Application No. 2022-187046, filed on Nov. 24, 2022, in the Japan Patent Office, the entire disclosure of which is hereby incorporated by reference herein.

BACKGROUND

Technical Field

Embodiments of the present disclosure relate to a fixing device and an image forming apparatus.

Related Art

A fixing device is known that includes a rotating fixing member, a pressing member, a heat source, and a reflecting member. The pressing member presses a recording material passing through a nip portion formed in contact with an outer circumferential surface of the fixing member. The heat source is placed inside the fixing member. The reflecting member is placed inside the fixing member and reflects radiation heat radiated from the heat source toward an inner circumferential surface of the fixing member.

SUMMARY

In an embodiment of the present disclosure, there is provided a fixing device that includes a fixing member, a pressing member, a heat source, and a reflecting member. The fixing member is rotatable. The pressing member presses and contacts an outer circumferential surface of the fixing member to form a nip portion. The heat source is disposed inside a loop of the fixing member. The reflecting member includes a reflecting portion, a pressure receiving portion, and an extending portion. The reflecting portion reflects heat, which is radiated from the heat source to at least a portion of the fixing member, toward an inner circumferential surface of the fixing member. The pressure receiving portion receives a pressing force of the pressing member via the fixing member. The extending portion extends at least from an area upstream from the nip portion to an area downstream from the nip portion in a direction of rotation of the fixing member and facing the inner circumferential surface of the fixing member. The reflecting member is in non-contact with one or more of members disposed inside the loop of the fixing member, at least when the fixing member rotates.

In another embodiment of the present disclosure, there is provided an image forming device that includes the fixing device.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein.

Figure 1:
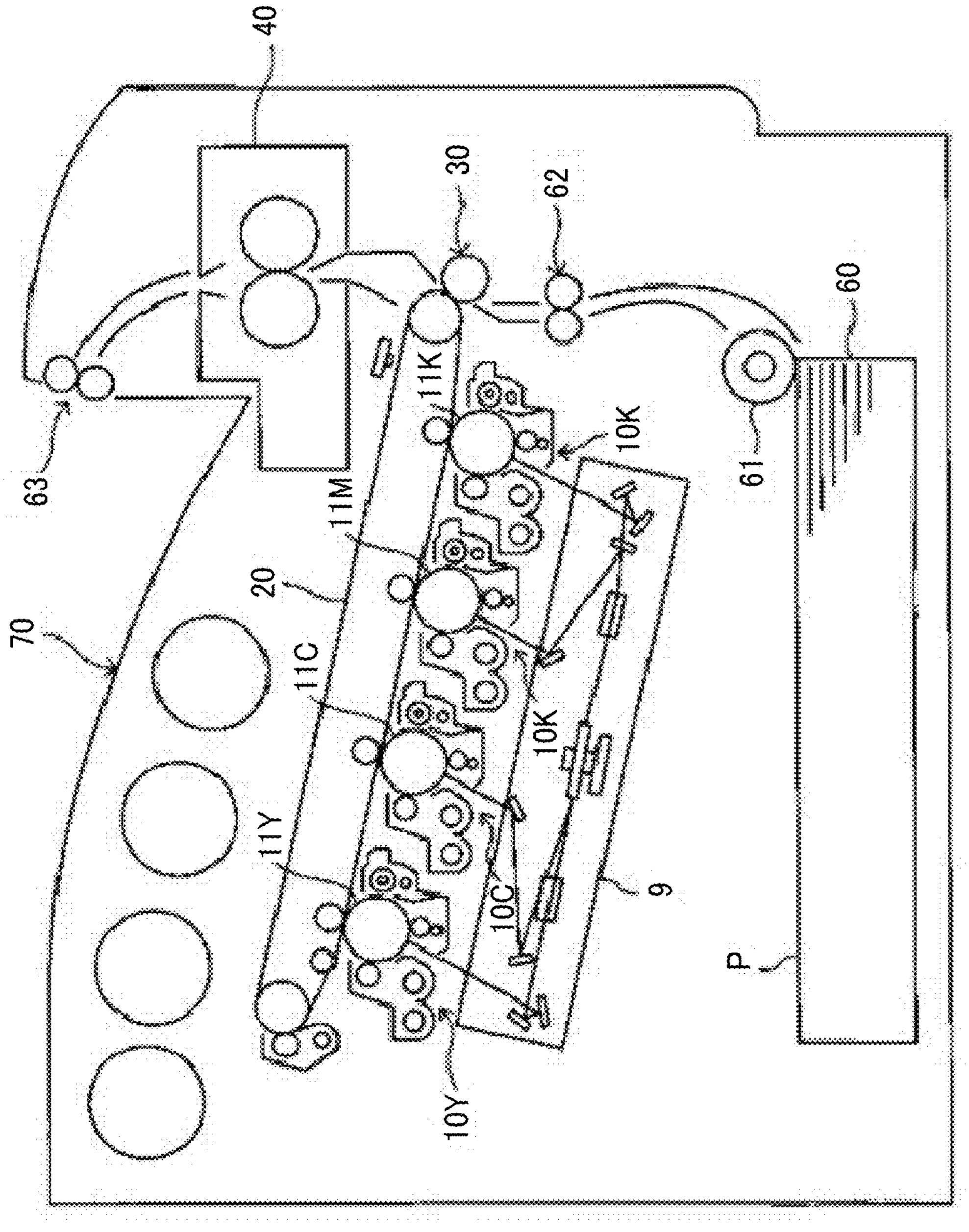
FIG. 1 is a schematic diagram of an image forming apparatus according to an embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

First, a description is given of an image forming apparatus to which the present disclosure is applied.

A description is given below of a laser printer as an electrophotographic image forming apparatus, according to an embodiment of the present disclosure. FIG. 1 is a schematic diagram of an image forming apparatus 1, according to an embodiment of the present disclosure. The image forming apparatus 1 includes an image forming device 100 that forms an image on a sheet P as a recording material. The image forming device 100 of the tandem-type image forming apparatus in which image forming devices 10Y, 10M, 10C, and 10K for colors of yellow (Y), magenta (M), cyan (C), and black (K), respectively, are arranged in a rotation direction of an intermediate transfer belt 20 serving as an intermediate transferor. The image forming devices 10Y, 10M, 10C, and 10K include photoconductors 11Y, 11M, 11C, and 11K, respectively, serving as latent image bearers.

Each of the image forming devices 10Y, 10M, 10C, and 10K includes a charging device serving as a charger, an optical writing device 9 serving as an electrostatic-latent-image forming device, and a developing device serving as a developing unit around each of the photoconductors 11Y, 11M, 11C, and 11K, respectively. A primary transfer device as a primary transferor and a cleaning device as a cleaner are also disposed around each of the photoconductors 11Y, 11M, 11C, and 11K. The charging device uniformly charges the surface of the photoconductor to a specified potential. The optical writing device 9 irradiates the surface of the photoconductor uniformly charged by the charging device with light based on image data to form an electrostatic latent image. The developing devices develop the electrostatic latent images on the photoconductors to form toner images of toners of respective colors (yellow, magenta, cyan, and black), respectively, which is referred to as a developing process. The primary transfer device transfers the toner image on the photoconductor onto the intermediate transfer belt 20, and the cleaning device removes untransferred toner on the photoconductor to clean it.

The respective color toner images formed on the photoconductors 11Y, 11M, 11C, and 11K are primarily transferred to the intermediate transfer belt 20 by the primary transfer device to overlap each other, thereby forming the color toner images on the intermediate transfer belt 20. The color toner image on the intermediate transfer belt 20 is conveyed to a region (secondary transfer region) opposite a secondary transfer device 30 as the intermediate transfer belt 20 rotates.

The image forming apparatus includes a sheet tray 60 below the image forming device 100. The sheet tray 60 holds the sheet P and serves as a feeding unit for feeding the sheet P. A pickup roller 61 feeds the sheets P one by one from the sheet tray 60 to a conveyance passage. A registration roller pair 62 conveys the sheet P to the secondary transfer region along the conveyance passage.

The registration roller pair 62 conveys the sheet P to the secondary transfer region at a specified timing at which the four-color toner image on the intermediate transfer belt 20 reaches the secondary transfer region, and the secondary transfer device 30 secondarily transfers the four-color toner image from the intermediate transfer belt 20 onto the sheet P. The sheet P on which the color toner image is formed is then conveyed to a fixing device 40 serves as a fixing unit. The fixing device 40 applies heat and pressure to the sheet P to fix the four-color toner image onto the sheet P. After the four-color toner image is fixed onto the sheet P, the sheet P is conveyed along the conveyance passage, and an ejection roller pair 63 ejects the sheet P to an output tray 70.

Figure 4A:
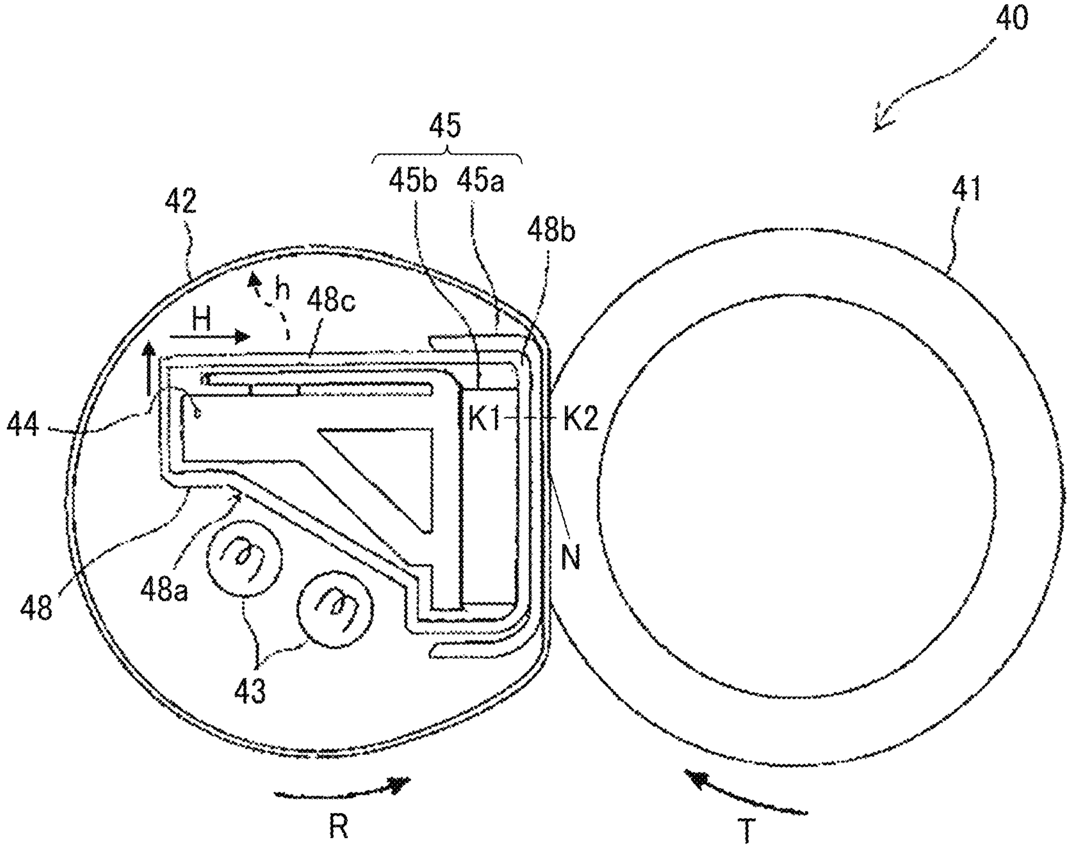
FIG. 4A is a diagram illustrating a fixing device of the image forming apparatus, according to an embodiment of the present disclosure.
Figure 4B:
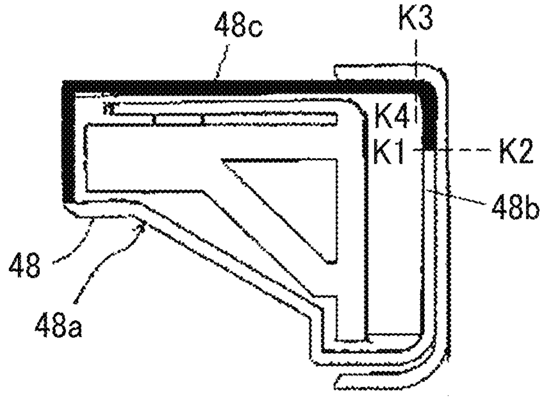
FIG. 4B is a diagram illustrating a reflector in the fixing device of the image forming apparatus, according to an embodiment of the present disclosure.

FIGS. 4A and 4B are diagrams each illustrating the fixing device according to an embodiment of the present disclosure. FIGS. 4A and 4B are diagrams when viewed from a rotation axis direction of a fixing belt 42. FIG. 4A is a diagram illustrating a configuration of the fixing device, and FIG. 4B is a diagram illustrating a configuration of a reflector, according to an embodiment of the present disclosure. A description is given of the fixing device with reference to FIG. 4A. The fixing device 40 includes a pressing roller 41 that serves as a pressing member, the fixing belt 42 that serves as a fixing member, and a heat source 43 (i.e., a halogen heater in FIG. 4A). The fixing device 40 performs fixing by heating and pressing.

A nip forming member 45 that serves as a nip forming member and is held by a fixing stay 44 that serves as a stay is disposed in the fixing belt 42. The nip forming member 45 includes a heat equalizing member 45*a* that serves as a sliding member disposed at the nip face and is a heat transfer member, and a resin pad 45*b* that serves as a pad and supports the heat equalizing member 45*a*. One of the roles of the resin pad 45*b* is heat insulation, which restricts heat absorption of the fixing belt 42 into the fixing stay 44 via the nip forming member 45 to prevent an increase in warm-up time and a typical electricity consumption (TEC) value. The heat equalizing member 45*a* extends in the rotation axis direction (width direction) of the fixing belt 42, and has, for example, a pad shape. The heat equalizing member 45*a* is arranged to equalize the temperature in the rotation axis direction of the fixing belt 42. In other words, the heat is removed from the portion of the fixing belt 42 where the temperature is high. The removed heat is transmitted to the portion of the fixing belt 42 where the temperature is low, so that the temperature of the fixing belt 42 in the rotation axis direction is equalized.

A fixing nip portion N that serves as a nip portion has a flat shape in the present embodiment, but may have a concave shape or other shapes. The fixing nip portion N has a concave shape so that the ejection direction of a leading end of a sheet turns to be closer to the pressing roller, and the separability of the sheet from the fixing belt 42 increases to prevent the occurrence of a jam.

The heat equalizing member 45*a* is a member of high heat conductive metal such as aluminum or copper having a thermal conductivity of 50 W/m·K or more. A coating, which is excellent in sliding performance, is applied to the surface of the heat equalizing member 45*a*. Examples of the materials of the coating include resin-based materials such as polyimide resin, fluororesin, polyphenylene sulfide resin, and saturated polyester resin. Such a resin-based coating material may be mixed with materials such as glass fiber, carbon, graphite, graphite fluoride, carbon fiber, molybdenum disulfide, and fluororesin.

As the material of the coating, a metal-based material can also be used. Examples of the metal-based coating material include materials such as molybdenum disulfide, nickel, and composite plating of nickel and fluororesin. The metal-based coating material also includes alumite or alumite impregnated with resin or metal. Ceramic can also be used as the coating material. Examples of ceramic used as the coating material include materials such as silicon carbide ceramic, roomed silicon ceramic, alumina ceramic, and mixtures thereof with, for example, molybdenum disulfide and fluororesin.

Alternatively, forming an alumite layer on the surface layer of the heat equalizing member 45*a* made of aluminum or aluminum alloys and filling the fine pores of the alumite layer with molybdenum disulfide generated by secondary electrolysis from the deepest portions of the fine pores to the outermost surface layer form the excellent coating.

A heat equalizing member may be made of, for example, graphene or graphite formed in a sheet shape.

Figure 13:
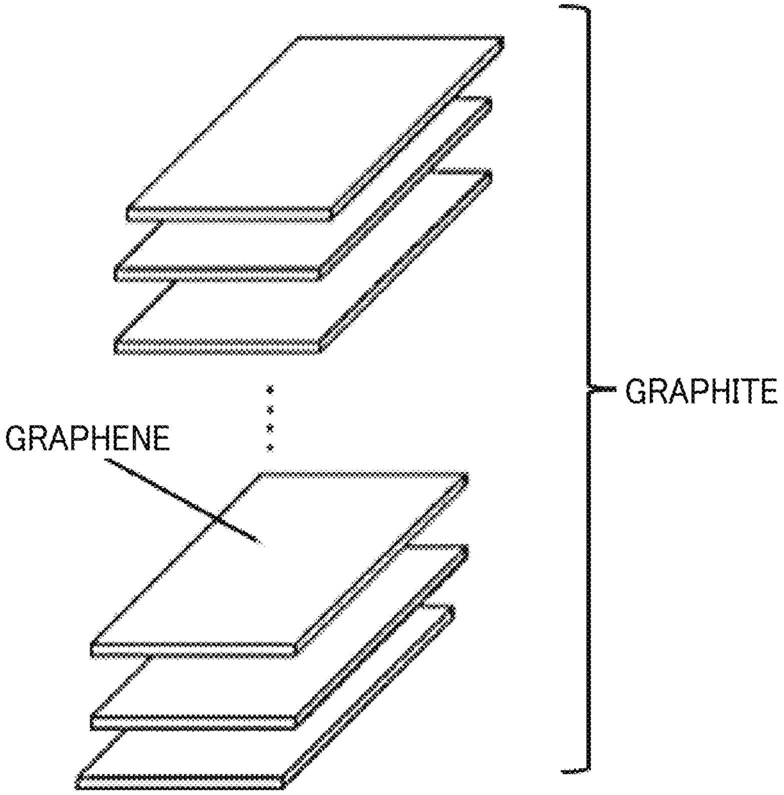
FIG. 13 is a diagram illustrating the relation between the graphene and the graphite.

FIG. 13 is a diagram illustrating the relation between graphene and graphite. As illustrated in FIG. 13, graphite is formed by stacking a large amount of layers each including carbon atoms, and one of the layers forming graphite is graphene. Graphene may be referred to as a graphene sheet.

Figure 10:
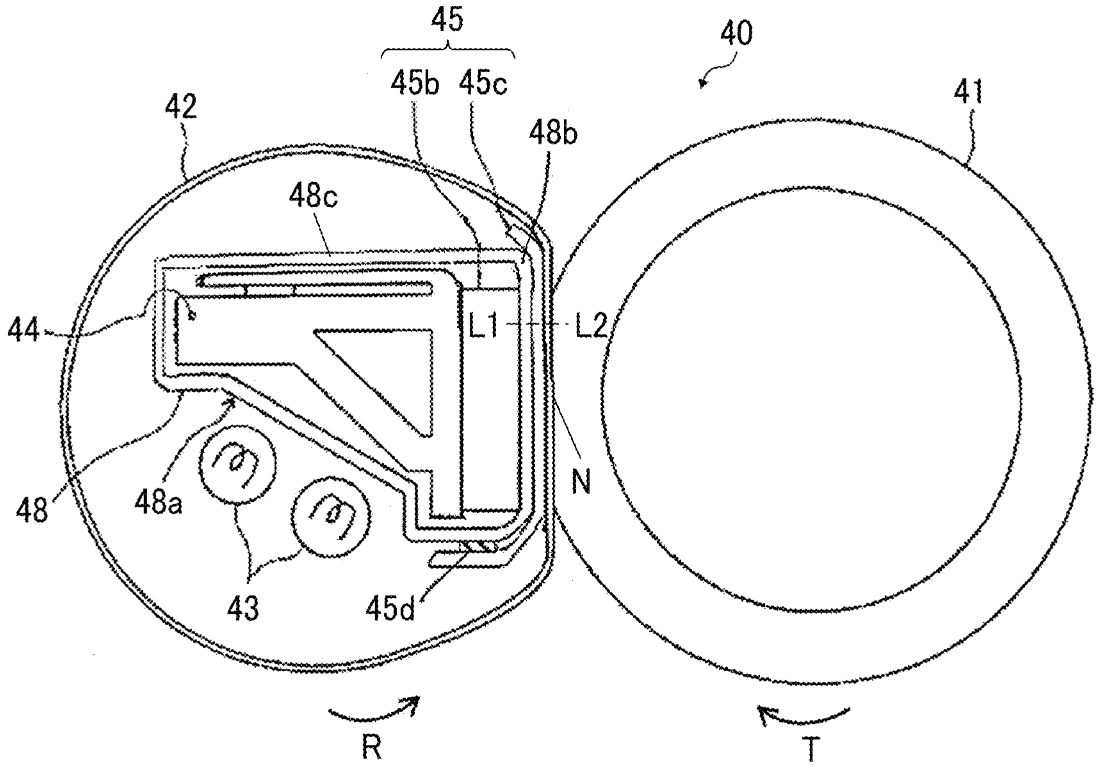
FIG. 10 is a diagram illustrating a case of using graphene in the fixing device, according to an embodiment of the present disclosure.

FIG. 10 is a diagram illustrating a fixing device in the case of using graphene or graphite as a heat equalizing member, according to an embodiment of the present disclosure. Graphene and graphite are sheet-like members and do not have the same rigidity as the heat equalizing member 45*a* formed of a metal member. As a result, in the present embodiment, graphene (graphite sheet) 45*c* is bonded to a reflector 48 with, for example, a heat-resistant double-sided tape 45*d* on the upstream side of the fixing nip portion N to be sandwiched between the reflector 48 and the inner circumferential surface of the fixing belt 42.

Figure 11:
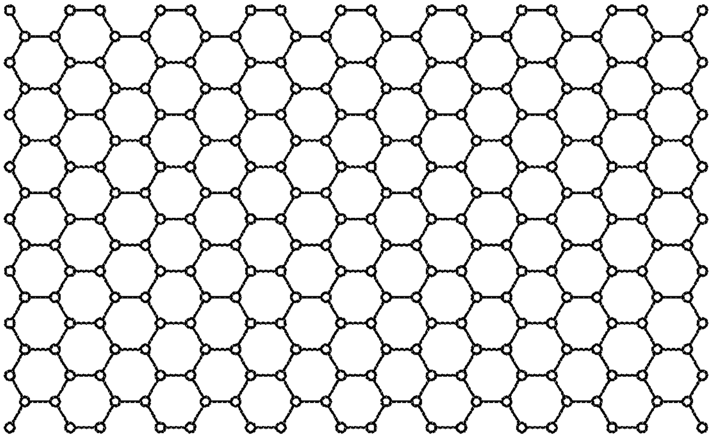
FIG. 11 is a diagram illustrating an atomic crystal structure of graphene.

FIG. 11 is a diagram illustrating an atomic crystal structure of graphene. The graphene is flaky powder, and has a planar hexagonal lattice structure of carbon atoms, as illustrated in FIG. 11. The graphene sheet is sheet-like graphene, and typically has a single layer. The graphene sheet may contain impurities in a single layer of carbon, and may have a fullerene structure. The fullerene structure is typically recognized as a compound consisting of a polycyclic ring in which the same number of carbon atoms are fused into a five-membered ring and a six-membered ring in the form of a cage, for example, C60, C70, and C80 fullerenes or other closed cage structures having three-coordinate carbon atoms.

The graphene sheet is an artifact and can be produced by, for example, a chemical vapor deposition (CVD) method. As the graphene sheet, a commercially available product can be used.

Graphene sheets have a thermal conductivity of 600 W/m·K in the longitudinal direction (the rotation axis direction of the fixing belt 42) and a thermal conductivity of 10 W/m·K in the thickness direction, so that forming the heat equalizing member from graphene sheets increases the heat transfer efficiency relative to the thickness direction (i.e., the direction in which the members are stacked), permitting the formation of a heat equalizing member having a high thermal conductivity in the longitudinal direction. Accordingly, the temperature unevenness in the longitudinal direction can be effectively reduced.

The size, the thickness, and the number of layers of the graphite sheet are measured by, for example, a transmission electron microscope (TEM).

Figure 12:
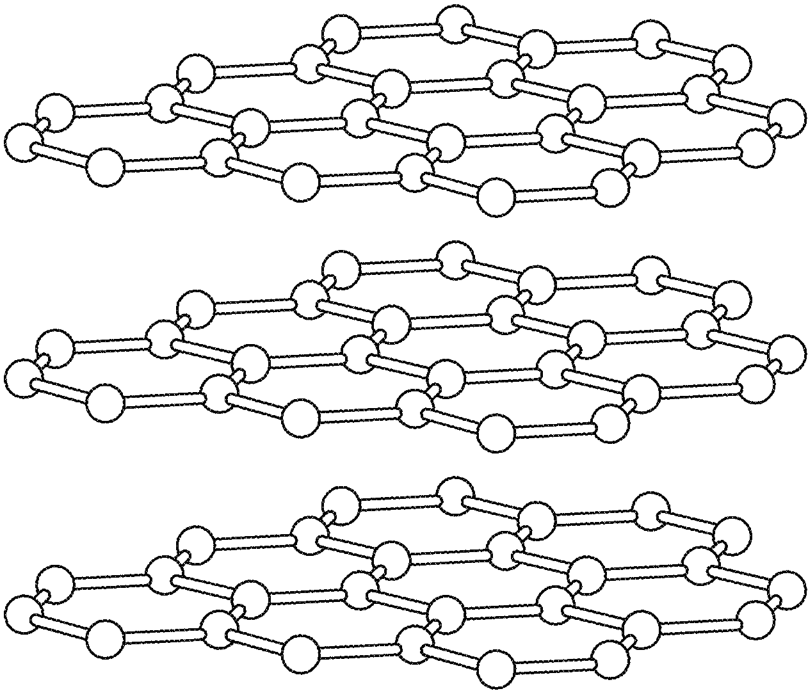
FIG. 12 is a diagram illustrating an atomic crystal structure of graphite.

The graphite in which graphene is multilayered has large thermal conductivity anisotropy. As illustrated in FIG. 12, the graphite has a crystal structure formed by layering a number of layers each having a condensed six-membered ring layer plane of carbon atoms extending in a planar shape. Among carbon atoms in this crystal structure, adjacent carbon atoms in the layer are coupled by a covalent bond, and carbon atoms between layers are coupled by a van der Waals bond. The covalent bond has a larger bonding force than a van der Waals bond. Accordingly, there is a large anisotropy between the bond between carbon atoms in a layer and the bond between carbon atoms in different layers.

The heat equalizing member is formed from graphene sheets so that the heat transfer efficiency relative to the thickness direction (i.e., the direction in which the members are stacked) is increased. Thus, a heat equalizing member having a high thermal conductivity is formed in the longitudinal direction. Accordingly, the temperature unevenness in the longitudinal direction can be effectively reduced.

A description is given with reference to FIG. 4A again. The pressing roller 41 includes a metal roller, a silicone rubber layer on the outer circumferential surface of the metal roller, and a release layer on the outer circumferential surface of the silicone layer. The release layer is made of perfluoroalkoxy alkane (PFA) or polytetrafluoroethylene (PTFE) to obtain releasability. The pressing roller 41 is pressed against the fixing belt by, for example, a spring. The rubber layer of the pressing roller 41 is compressed and deformed, so that a specified nip width is formed.

A driving force is transmitted to the pressing roller 41 from a drive source, such as a motor, included in the image forming apparatus via a gear to rotate the pressing roller 41. The pressing roller 41 rotates in a direction indicated by an arrow T in FIG. 4A. The fixing belt 42 is driven to rotate together with the pressing roller 41 by the transmission of a driving force from the pressing roller 41 at the fixing nip portion N. The fixing belt 42 rotates in a direction indicated by an arrow R in FIG. 4A. The pressing roller 41 may be a solid roller, or may be preferably a hollow roller because of low heat capacity. The pressing roller 41 may include a heat source such as a halogen heater. The silicone rubber layer of the pressing roller 41 may be solid rubber, or may use sponge rubber in a case where no heater is disposed inside the pressing roller 41. The sponge rubber is more desirable because of higher heat insulation, and thus reduces the heat loss of the fixing belt.

The fixing belt 42 is a belt made of metal such as nickel and a steel use stainless (SUS), or an endless belt or film made of resin material such as polyimide as a base material. The surface layer of the fixing belt 42 includes a release layer such as the PFA or PTFE layer to have releasability so that toner does not adhere thereto.

An elastic layer formed of, for example, a silicone rubber layer may be disposed between the base material and the release layer of the fixing belt 42. When no silicone rubber layer is formed on the fixing belt 42, the heat capacity decreases and the fixing property improves. When an unfixed image is pressed and fixed, a failure may occur that subtle irregularities on the surface of the belt are transferred on the image and an orange-surface-like mark remains on a solid portion of the image. To solve this problem, a silicone rubber layer of 100 μm or more is preferably disposed. Deformation of the silicone rubber layer reduces subtle irregularities and improves an image having a rough surface.

Figure 5:
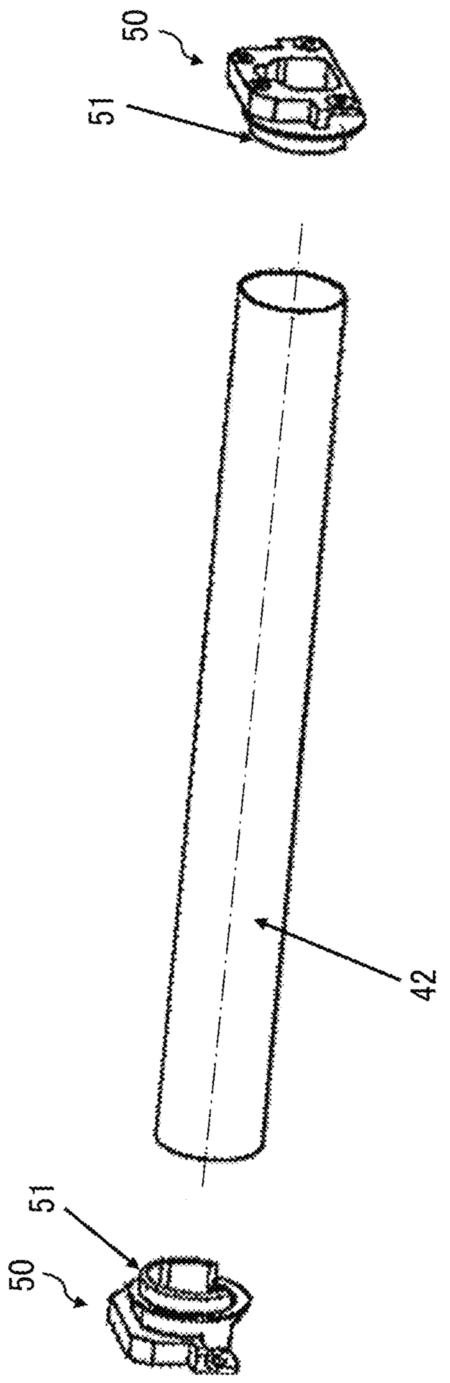
FIG. 5 is a diagram illustrating a configuration for supporting ends of a fixing belt in a rotation axis direction, according to an embodiment of the present disclosure.

FIG. 5 is a diagram illustrating a configuration for supporting ends of the fixing belt 42 in the rotation axis direction. The fixing device 40 includes flanges 50 that serve as a supporting member and supports the fixing belt 42 at the ends thereof in the rotation axis direction. The flange 50 includes a cylindrical portion 51 into which the fixing belt 42 is inserted. The fixing belt 42 is inserted into the cylindrical portion 51, so that the cylindrical portion 51 can rotatably support the fixing belt 42 from an inner circumferential side of the fixing belt 42.

A description is given with reference to FIG. 4A again. The fixing stay 44 is a hollow pipe-shaped metal body, and is made of metal such as aluminum, iron, or stainless steel. In the present embodiment, the fixing stay 44 has a rectangular shape, or may have another cross-sectional shape. This configuration prevents deformation of the nip forming member 45 that receives pressure from the pressing roller 41 and forms a uniform nip width in the rotation axis direction.

Two heat sources that raise the temperature of the fixing belt 42 are disposed inside a loop of the fixing belt 42. In the present embodiment, the heat source 43 is a halogen heater, and the fixing belt 42 is directly heated by the radiant heat of the heat source 43 from the inner circumferential side.

The heat source 43 according to the present embodiment is satisfactory as long as it heats the fixing belt 42, and may be, for example, a carbon heater.

In the fixing device 40, a liquid or semi-solid volatile substance (lubricant) is used for the purpose of enhancing the slidability of components in the fixing device, reducing torque, and increasing the durability of the fixing device. In the present embodiment, examples of the lubricant used include fluorine grease and silicone oil.

In order to reduce the loss of heat radiated from the heat source 43 as much as possible, the reflector 48 that serves as a reflecting member and has a reflecting portion 48*a* that serves as a reflecting portion and reflects heat toward the fixing belt is disposed in the fixing belt 42. The reflector 48 is made of, for example, high-brightness aluminum in which a plurality of reflection-increasing films and a protection film are formed on a surface layer based on a high-purity aluminum material serving as a metal member. Depending on a configuration, an aluminum plate on which silver is deposited to further increase the reflectance may be used. In the present embodiment, the reflector 48 is molded by pressing a plate material such as a metal plate, but the embodiments of the present disclosure are not limited thereto.

The fixing device 40 according to an embodiment of the present disclosure has a gap between the fixing belt 42 and the reflector 48 in a state where the reflector 48 is heated by the heat source 43 so that the reflector 48 is deformed by a maximum amount. Even if the reflector 48 is deformed by heat from the heat source 43, the reflector 48 does not contact the fixing belt 42.

The reflector is a characteristic part of an embodiment of the present disclosure, and a description is given of details thereof below.

A description is given of the characteristic part of an embodiment of the present disclosure. Before the description of the characteristic part, a configuration to be compared (a comparative example) is exemplified, and a description is given below of an inconvenience thereof.

First Comparative Example

Figure 2:
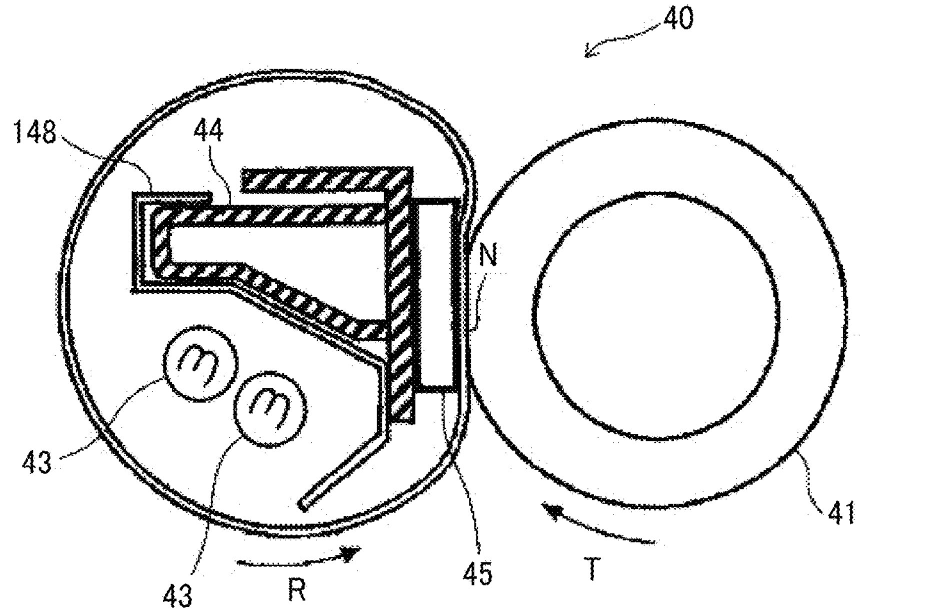
Background Art FIG. 2
FIG. 2 is a diagram illustrating an inconvenience of a fixing device of an image forming apparatus, according to a first comparative example.

FIG. 2 is a diagram illustrating an inconvenience of the fixing device 40 according to a first comparative example.

FIG. 2 is a diagram illustrating the fixing device 40 according to the first comparative example when viewed from the rotation axis direction of the fixing belt 42.

The reflectance of a reflector 148 in the fixing device 40 according to the first comparative example is approximately 95 to 98%. The reflector 148 does not reflect 100% of the radiant heat of the heat source 43, and the reflector 148 itself absorbs a slight amount of the radiant heat. Thus, the temperature of the reflector 148 gradually increases. In particular, when a large amount of sheets are continuously conveyed, in the fixing device 40 according to the first comparative example illustrated in FIG. 2, the temperature of the reflector 148 increased to approximately 300 to 400° C.

When a heat load of a certain level or more is applied to the reflector 148, the aluminum or silver layer of the reflector 148 changes color. Accordingly, not only the reflectance decreases and the original performance cannot be achieved but also an inconvenience of the heat load is not preferable from the viewpoint of safety. As a result, the configuration according to the first comparative example can only achieve productivity that does not reach the temperature range, and is a bottleneck in enhancing the productivity of a machine.

Second Comparative Example

Figure 3:
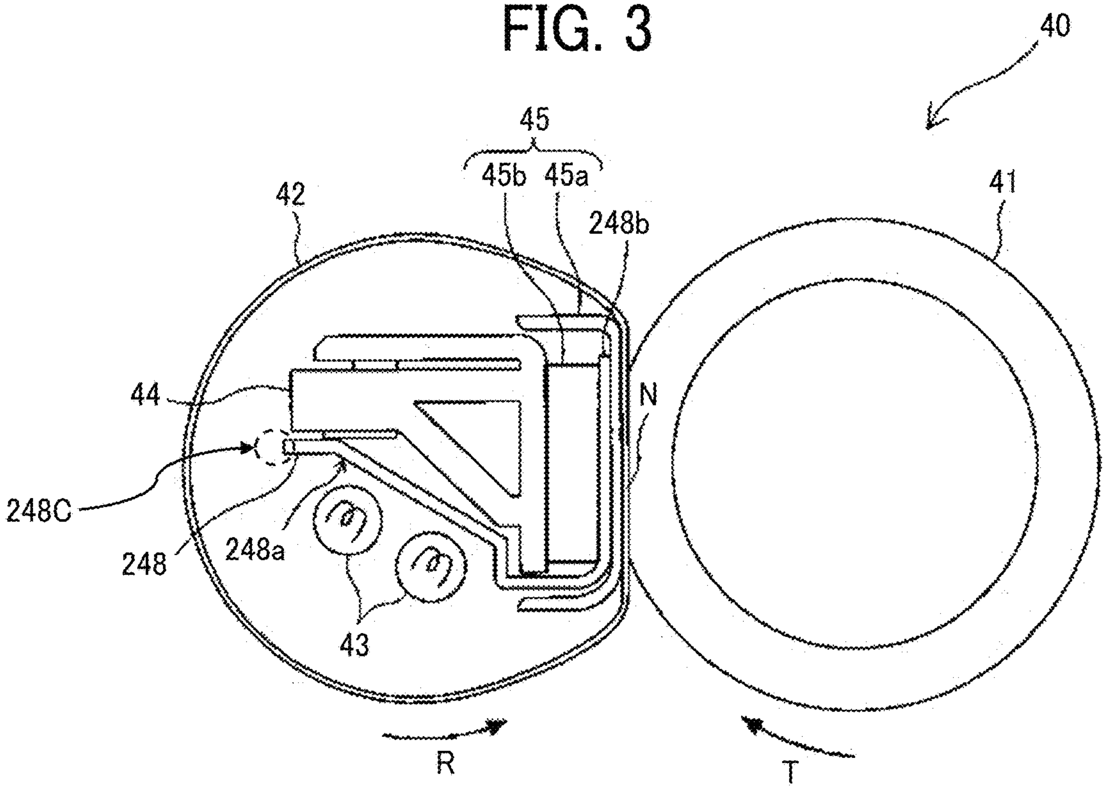
Background Art FIG. 3
FIG. 3 is a diagram illustrating an inconvenience of a fixing device of an image forming apparatus, according to a second comparative example.

FIG. 3 is a diagram illustrating an inconvenience of the fixing device 40 according to a second comparative example.

FIG. 3 is a diagram illustrating the fixing device 40 according to the second comparative example when viewed from the rotation axis direction of the fixing belt 42.

The second comparative example has the following configuration in consideration of an inconvenience of the configuration according to the first comparative example. In FIG. 3, a reflector 248 has a pressure receiving portion 248*b* that extends to a region receiving the pressing force from the pressing roller 41 between the heat equalizing member 45*a* and the resin pad 45*b*. The pressure receiving portion 248*b* is in contact with the heat equalizing member 45*a*. The pressure receiving portion 248*b* is located in a pressure region that receives a pressing force from the pressing roller 41. The configuration according to the second comparative example is different from the configuration according to the first comparative example described above in a point that the pressure receiving portions are disposed.

As described above, the reflector 248 according to the second comparative example is made of aluminum serving as a metal member having good heat conductivity. Accordingly, the heat absorbed by a reflecting portion 248*a* is rapidly conducted to the entire component. The heat of the reflector 248 moves to the heat equalizing member 45*a* that contacts the pressure receiving portion 248*b*. The moved heat of the reflector 248 is conducted to the fixing belt 42 through the heat equalizing member 45*a*, and is used for toner melting.

The reason why the above-described configuration is adopted is that the heat of the reflector 248 can be effectively used as compared with a case where the heat of the reflector 248 is discharged to other members such as the fixing stay 44. The purpose of the above-described configuration is that the time for which the heat source 43 is turned on is shortened and that power consumption is reduced.

In the configuration according to the second comparative example, an end 248C of the reflector 248 near the heat source 43 is not supported by another member. For example, it is assumed that the end 248C is contacted with and is supported by the fixing stay 44. In such a case, the heat absorbed by the reflecting portion 248*a* is transmitted to, for example, the fixing stay 44, and thus the purpose of effective use of the heat of the reflector 248 may not be achieved. In the configuration according to the second comparative example, the fixing belt 42 transmits heat to a recording medium (transfer material) such as a sheet at the fixing nip portion N, and then the temperature of the fixing belt 42 is relatively low in a range from a time when the fixing belt 42 has passed through the fixing nip portion N to a time when the radiant heat from the heat source 43 is radiated. There is a temperature difference of approximately 15 to 20° C. before and after passing through the fixing nip portion N. As a result, in the configuration according to the second comparative example, temperature nonuniformity occurs within the circumferential surface of the fixing belt 42.

Alternatively, in order to maintain the positional accuracy of the end 248C of the reflector 248 near the heat source 43, a method may also be employed in which the end 248C of the reflector 248 in the rotation axis direction of the fixing belt 42 is supported by the flange 50. However, the heat of the reflector 248 may be transferred to the flange 50, and as a result, the temperature of the flange 50 may increase.

In the fixing device, a liquid or semi-solid volatile substance (lubricant) is used for the purpose of enhancing the slidability of components in the fixing device, reducing torque, and increasing the durability of the fixing device. On the other hand, it is known that a lubricant generates fine particles when the temperature thereof turns to the specified temperature or more. It is assumed that heat is transferred to the flange 50 so that the temperature of the flange 50 increases, and then it is assumed that the temperature of the lubricant turns to the specified temperature or more. Since the lubricant has good fluidity, an inconvenience occurs that a small amount of fine particles adhere to the flange 50 as well as to the fixing belt 42 as the fixing belt 42 rotates in the fixing device, which is not desirable.

Accordingly, in order to prevent the above-described inconvenience from occurring, the reflector according to the present embodiment has the following configuration. A description is given of the detailed configuration with reference to FIGS. 4A and 4B. The configuration according to an embodiment of the present disclosure and the configuration according to the second comparative example are different from each other in the configuration of the reflectors, and the other configurations are substantially the same.

First, the reflector 48 has the reflecting portion 48*a* that reflects radiation heat from the heat source 43 toward the fixing belt 42, and a pressure receiving portion 48*b* that receives the pressing force of the pressing roller 41. The reflecting portion 48*a* is disposed between the heat source 43 and the fixing stay 44. The pressure receiving portion 48*b* is disposed to be sandwiched between the heat equalizing member 45*a* as a sliding member and the resin pad 45*b*. Accordingly, the heat of the reflector 48 moves to the heat equalizing member 45*a*, and a temperature increase of the reflector 48 can be prevented. The pressure receiving portion 48*b* is located in a pressure region in which the pressing force of the pressing roller 41 is received. As a result, the adhesion between the heat equalizing member 45*a* and the pressure receiving portion 48*b* is increased, and the heat transferability increases. Further, the heat exhaust efficiency of the reflector 48 can be enhanced.

The pressure receiving portion 48*b* abuts the inner circumferential surface of the fixing belt 42 with sliding members interposed therebetween. The slidability of the sliding members relative to the inner circumferential surface of the fixing belt 42 is higher than the slidability of the sliding members relative to the inner circumferential surface of the fixing belt 42. Accordingly, the sliding resistance of the fixing belt can be reduced as compared with the case where the pressure receiving portion 48*b* of the reflector 48 is contacted with the inner circumferential surface of the fixing belt 42 to exhaust the heat of the reflector 48 to the fixing belt 42 without interposing the heat equalizing member 45*a* therebetween. As a result, an increase in torque for rotating the fixing belt 42 can be prevented, and abrasion of the inner circumferential surface of the fixing belt 42 can also be prevented.

In the configuration according to the second comparative example described above, the relative positions of the reflector 48 and the heat source 43 are to be properly maintained. Accordingly, it is preferable that the reflector 48 be supported by any one of the components forming the fixing device. For example, a configuration in which the reflector 48 is supported by the flange 50 disposed at an end in a longitudinal direction (the end in the rotation axis direction) of the fixing stay 44 or the fixing belt 42 is typically adopted. However, a configuration in which the reflector 48 supported by the above-described components is not preferable from the viewpoint of achieving both the prevention of an excessive temperature increase of the reflector 48 and the effective use of heat.

In the configuration according to an embodiment of the present disclosure, as illustrated in FIG. 4A, the end 248C of the reflector 248 in the configuration according to the second comparative example (see FIG. 3), in other words, an opening portion of the reflector 248 in the rotation direction (circumferential direction) of the fixing belt 42, is extended toward the downstream side (exit side) of the fixing nip portion N, and the extended portion is sandwiched between the heat equalizing member 45*a* and the resin pad 45*b*. Specifically, as illustrated in FIG. 4B, the reflector 48 is provided with an extending portion 48*c* (the blackened portion of the reflector 48 in FIG. 4B). The extending portion 48*c* is continuous with the reflecting portion 48*a*. The extending portion 48*c* extends to face an inner circumferential surface of the fixing belt 42 at least from an area upstream from the fixing nip portion to an area downstream from the fixing nip portion in the direction of rotation of the fixing belt 42 indicated by the arrow R in FIG. 4A, and does not directly receive heat radiated from the heat source 43. In other words, the reflector 48 according to the present embodiment includes a portion (the reflecting portion 48*a*) that directly receives heat radiated from the heat source 43 and a portion (the extending portion 48*c*) that does not directly receive heat radiated from the heat source 43. In FIG. 4B, the extending portion 48*c* is extended to a position of a broken line of K1-K2 (in the vicinity of an end on the right side of the resin pad 45*b*, the exit side of the fixing nip portion N) on the downstream side of the fixing nip portion, so that the extending portion 48*c* can be sandwiched between the heat equalizing member 45*a* and the resin pad 45*b*. Furthermore, the extending portion 48*c* is continuous with the pressure receiving portion 48*b*. The reason why the extending portion 48*c* is sandwiched between the heat equalizing member 45*a* and the resin pad 45*b* as described above is that consideration is given that both the effect of heating the fixing nip portion N leading to effective utilization of heat and the effect of supporting the extending portion 48*c* are obtained. To achieve the above-described effects, the extending portion 48*c* may only be in contact with at least the heat equalizing member 45*a*. As described above, the heat equalizing member 45*a* is metal as described above, and then has a specified rigidity. Based on the above-described considerations, in the present configuration including the heat equalizing member 45*a*, the extending portion 48*c* may stay up to a position separated from the resin pad 45*b* on the downstream side of the fixing nip portion N in the rotation direction of the fixing belt 42, for example, a position of a broken line of K3-K4 illustrated in FIG. 4B.

The configuration illustrated in FIG. 10 according to an embodiment of the present disclosure is different from the configuration illustrated in FIG. 4A in a point that graphene 45*c* is used instead of the heat equalizing member 45*a*. The extending portion 48*c* in this configuration extends to a position of a broken line of L1-L2 near an end of the right side of the resin pad 45*b* (near an exit side of the fixing nip portion N) on a downstream side of the fixing nip portion. With such a configuration, it is possible to sandwich and support the extending portion 48*c* in the fixing nip portion N and to sandwich the extending portion 48*c* between the graphene 45*c* and the resin pad 45*b*. At this time, in the present configuration including the graphene 45*c*, it is preferable that the extending portion 48*c* be extended to the position of the broken line of L1-L2 illustrated in FIG. 10, rather than being confined to a position separated from the resin pad 45*b* on the downstream side in the fixing nip portion N in the rotation direction of the fixing belt 42, for example, the position corresponding to the broken line of K3-K4 illustrated in FIG. 4B. The reason for adopting such a configuration is because it is considered that, as described above, both the effect of heating the fixing nip portion N leading to effective use of heat and the effect of supporting the extending portion 48*c* are obtained, and there is further another reason. The graphene 45*c* is a sheet-like member. Accordingly, the graphene 45*c* is not rigid. On the other hand, in order to support the extending portion 48*c* (the end of the extending portion 48*c*), it is preferable to sandwich the extending portion 48*c* with some components. For example, if the extending portion 48*c* does not extend to the position of the broken line of L1-L2 and the pressure receiving portion 48*b* is disposed only immediately after the exit of the fixing nip portion as in the configuration according to the second comparative example, there is no member for sandwiching. As a result, supporting the extending portion 48*c* (the end of the extending portion 48*c*) may be difficult. In such a case, the extending portion 48*c* (the end of the extending portion 48*c*) turns to be free and contacts the inner circumferential portion of the fixing belt 42 and the fixing stay 44, which may contradict the purpose of effective use of heat. Accordingly, the above-described configuration is adopted from the viewpoint of preventing this problem.

With such a configuration, the reflector 48 according to an embodiment of the present disclosure is arranged opposite the fixing belt 42 to extend around the inner circumferential side of the fixing belt 42 from the upstream side to the downstream side of the fixing nip portion when viewed from the rotation axis direction of the fixing belt 42. The reflector 48 does not contact (not to be in contact with) one or more of the members disposed on the inner circumferential side of the fixing belt 42, such as the fixing stay 44 and the fixing belt 42, at least at the time of rotation of the fixing belt 42.

The reflector 48 according to an embodiment of the present disclosure has a configuration such that the pressure receiving portion 48*b* and the other parts of the reflector 48 including the extending portion 48*c* are continuously integrated on both the upstream side and the downstream side in the rotation direction of the fixing belt 42. Accordingly, the nip forming member 45 and the reflector 48 are thermally continuous with each other on both the upstream side and the downstream side of the fixing nip portion N, and thus thermal loss can be further prevented. The reflector 48 according to an embodiment of the present disclosure has a configuration such that the pressure receiving portion 48*b* and the other parts of the reflector 48 are continuously integrated on both the upstream side and the downstream side in the rotation direction of the fixing belt 42. However, the configuration is not limited thereto as long as the pressure receiving portion 48*b* and the other parts of the reflector 48 are thermally continuous. The reflector 48 according to an embodiment of the present disclosure is formed by machining one metal plate, but is not limited to this, and may be formed by connecting a plurality of metal plates. Forming the reflector by machining one metal plate is more desirable to achieve rigidity and is preferable in terms of further thermal continuity.

A base material of the reflector 48 is metal such as aluminum, and has specified rigidity, so that the reflector 48 can maintain a stable shape in a circumferential direction of the fixing belt. As a result, the reflector 48 can be maintained in non-contact with the fixing stay 44 and the fixing belt 42.

With such a configuration, the heat does not move to components disposed on an inner circumferential side in the fixing belt 42, and then the heat can be effectively utilized. In addition, the reflector 48 is in contact with the heat equalizing member 45*a* (or the graphene 45*c*), and thus an excessive temperature increases due to a temperature increase of the reflector 48 can be prevented.

With the above-described configuration, as illustrated in FIG. 4A, heat H of the reflector 48 moves toward the downstream side of the fixing nip portion along the extending portion 48*c*. Heat h, which is a part of the heat H, is transmitted from the reflector 48 to the fixing belt 42. The movement amount of the heat H and the transmission amount of the heat h are not uniform because they depend on conditions such as the start-up of the fixing device, a warming state, and continuous sheet feeding, and because temperature distributions differ between units of the fixing device. In the configuration according to the second comparative example, the temperature in a range from a time when the fixing belt 42 passes through the fixing nip portion N to a time when the radiant heat from the heat source 43 is radiated is relatively low. On the other hand, since the configuration according to an embodiment of the present disclosure includes the extending portion 48*c* as described above, the problem of low temperature in the above-described range can be solved.

In other words, in an embodiment of the present disclosure, the heat reflected by the reflector 48 is transmitted throughout the entire inner circumferential of the fixing belt 42. As a result, occurrence of the temperature unevenness in the circumference of the fixing belt 42 can be prevented.

Figure 6:
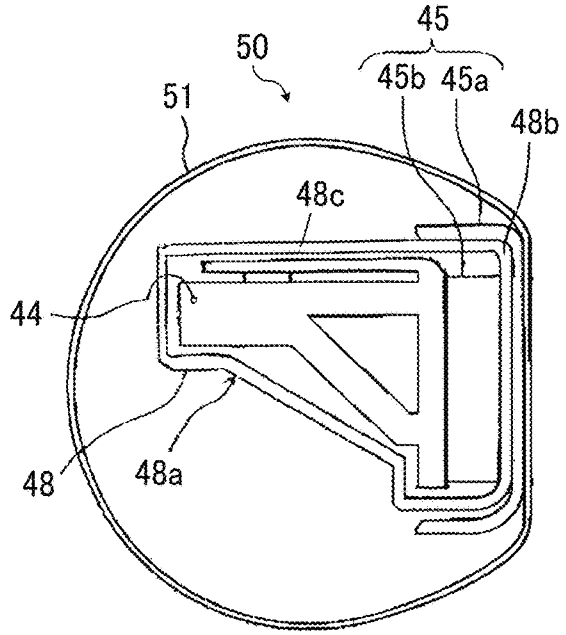
FIG. 6 is a diagram illustrating a positional relationship between the fixing belt and a reflector in the fixing device, according to an embodiment of the present disclosure.

FIG. 6 is a diagram illustrating the positional relationship between the reflector and a flange in the fixing device according to an embodiment of the present disclosure. FIG. 6 is a diagram of the fixing device 40 when viewed from the rotation axis direction of the fixing belt 42. In FIG. 6, only the cylindrical portion 51 of the flange 50 is illustrated. FIG. 6 illustrates that the reflector 48, and the cylindrical portion 51 of the flange 50 are not in contact with each other. In the fixing device according to the present embodiment, the reflector 48 can be supported on both the upstream side (entrance side) and the downstream side (exit side) of the fixing nip portion N, so that the reflector 48 does not need to be supported by the flange 50. As a result, the increase of the temperature of the flange 50 due to heat transfer from the reflector 48 can be prevented. With such a configuration, fine particles generated from a liquid or semi-solid volatile substance (lubricant) adhering to the flange 50 can be reduced, which can also contribute to a reduction in load on the environment.

In the fixing device according to the present embodiment, the cylindrical portion 51 of the flange 50 is engaged with both ends of the fixing belt 42 in the rotation axis direction, but the flange 50 does not restrict the behavior (rotation locus) of the fixing belt 42. It is assumed that the locus is different between when the fixing belt 42 rotates and when the fixing belt 42 stops, and the relative position between the fixing belt 42 and the reflector 48 is also not the same. An object of the present disclosure is heat transfer when at least the fixing belt 42 rotates. Even if the reflector 48 contacts a member of the fixing device such as the fixing belt 42 other than the nip forming member 45 when the fixing belt 42 stops to rotate, which does not depart from the object of the present disclosure.

Figure 7:
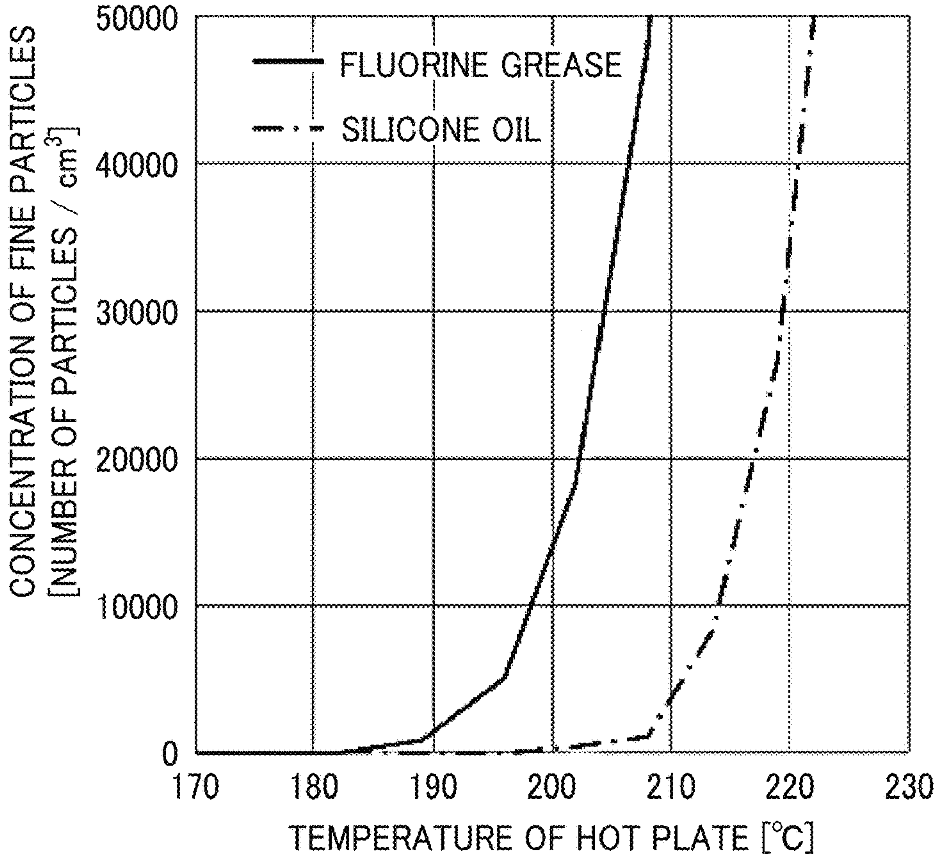
FIG. 7 is a graph illustrating the relation between the concentration of fine particles generated from fluorine grease and silicone oil and the temperature of a hot plate.

FIG. 7 is a graph illustrating the relation between the temperature of a hot plate and the concentration of fine particles generated from fluorine grease and silicone oil (the generated number of fine particles per one $cm^3$).

In FIG. 7, a solid line indicates fluorine grease and a one-dot chain line indicates silicone oil. In the present test for examining the relation illustrated in FIG. 7, the fluorine grease and the silicone oil in a sample container were heated in the 1 $cm^3$ chamber (the number of times of ventilation: five times) compliant with JIS A1901.

Figure 8:
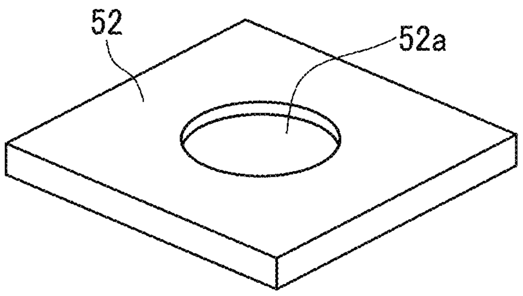
FIG. 8 is a perspective view of a sample container, according to an embodiment of the present disclosure.

FIG. 8 is a perspective view of the sample container.

As illustrated in FIG. 8, as a sample container 52, an aluminum plate with a size of 50 mm×50 mm×5 mm provided with a recess 52*a* having a diameter of ϕ22 mm and a depth of 2 mm is used, and a sample is placed in the recess 52*a*. The sample container 52 in which the sample was placed was placed on a hot plate of a heating device (Clean Hotplate MH-180CS manufactured by AS ONE Corporation and Controller MH-3CS manufactured by AS ONE Corporation), and the sample was heated at a preset temperature of 250° C. While monitoring the temperature of the hot plate, the concentration of fine particles in the chamber was measured with a measuring device (Fast Response Particle Sizer FMPS: Fast Mobility Particle Sizer, TSI; Model 3091) was used for measurement (Use Averaging Interval: 30 seconds, at a time of Export). The sample volume (amount of fluorine grease and amount of silicone oil) was set to be 36 μl.

A description is given with reference to FIG. 7 again. In FIG. 7, the temperature of the hot plate is illustrated on the horizontal axis. Since a temperature increase of the hot plate and a temperature increase of the lubricant change almost synchronously, the temperature of the hot plate is regarded as the temperature of the fluorine grease and the temperature of the silicone oil in FIG. 7.

As illustrated in FIG. 7, the fine particles started to be generated when the temperature of the fluorine grease reached approximately 180° C. The concentration of fine particles rapidly increased when the temperature exceeded approximately 190° C. At 190° C. or higher at which the concentration of the fine particles rapidly increases, the concentration of the fine particles in the chamber turned to be 4000 particles/$cm^3$ or more.

As illustrated in FIG. 7, the fine particles started to be generated when the temperature of the silicone oil has reached approximately 200° C. The concentration of fine particles rapidly increased when the temperature has exceeded approximately 210° C. At 210° C. or higher at which the concentration of the fine particles rapidly increases, the concentration of the fine particles in the chamber have turned to be 4000 particles/$cm^3$ or more.

Accordingly, when the temperature of silicone oil used as a lubricant has exceeded 200° C. and the temperature of fluorine grease has exceeded 180° C., fine particles are generated. In the European environment standard (Blue Angel) which defines the amount of fine particles in 10-minute printing, it is desirable that the temperature of the flange 50 be 200° C. or lower, more preferably 180° C. or lower, after 10-minute continuous printing.

Figure 9:
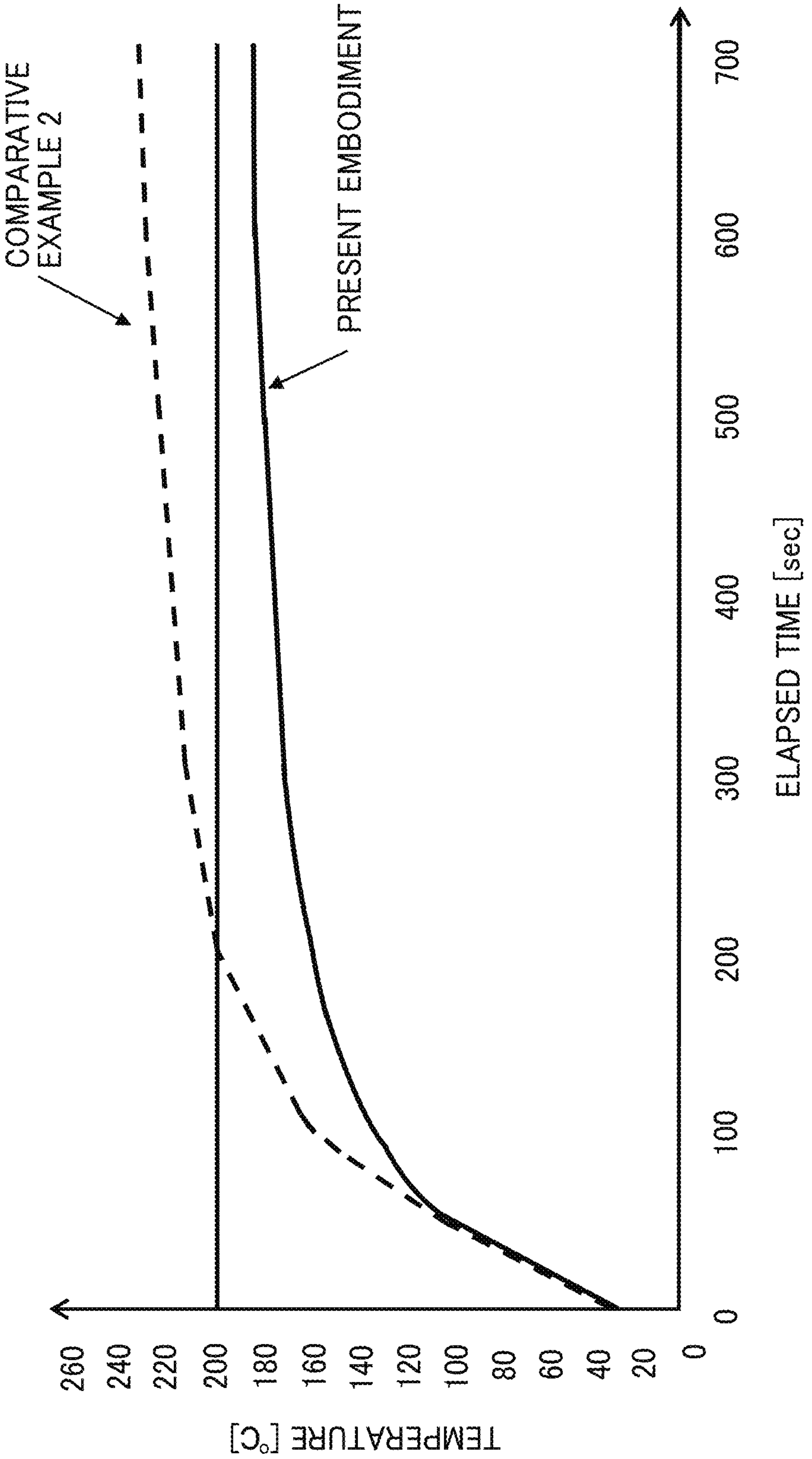
FIG. 9 is a graph illustrating the temperature of a flange versus the time of continuous image formation in an image forming apparatus including a fixing device, according to an embodiment of the present disclosure.

FIG. 9 is a diagram illustrating the temperature of a flange 50 versus the time of continuous image formation in an image forming apparatus (a full-color printer, 70 copies per minute (cpm)) including the fixing device of FIG. 4A according to an embodiment of the present disclosure.

In FIG. 9, a solid line represents the present embodiment, and a broken line represents the second comparative example.

As illustrated in FIG. 9, in the image forming apparatus (a full-color printer, 70 copies per minute (cpm)) including the fixing device according to the second comparative example in which ends of the reflector 48 in the rotation axis direction are supported by the flange 50, the temperature of the flange 50 exceeds 200° C. after 200 seconds. On the other hand, in the image forming apparatus (a full-color printer, 70 copies per minute (cpm)) including the fixing device according to an embodiment of the present disclosure in which the reflector 48 is not supported by the flange 50, the temperature of the flange 50 can be maintained at 180° C. after 10-minutes continuous printing.

The above-described embodiments and modification are examples. Embodiments of the present disclosure can provide, for example, some advantages in the following aspects.

First Aspect

In a first aspect, a fixing device (e.g., the fixing device 40) includes a fixing member (e.g., the fixing belt 42), a pressing member (e.g., the pressing roller 41), a heat source (e.g., the heat source 43), and a reflecting member (e.g., the reflector 48). The fixing member is rotatable. The pressing member presses and contacts an outer circumferential surface of the fixing member to form a nip portion (e.g., the fixing nip portion N). The heat source is disposed inside a loop of the fixing member. The reflecting member includes a reflecting portion (e.g., the reflecting portion 48*a*), a pressure receiving portion (e.g., the pressure receiving portion 48*b*), and an extending portion (e.g., the extending portion 48*c*). The reflecting portion reflects heat radiated from the heat source toward an inner circumferential surface of the fixing member. The pressure receiving portion receives the pressing force of the pressing member via the fixing member. The extending portion extends from an area upstream from the nip portion to an area downstream from the nip portion in a direction of rotation of the fixing member. The reflecting member is in non-contact with one or more of members disposed inside the loop of the fixing member at least when the fixing member rotates.

Second Aspect

In a second aspect, in the fixing device (e.g., the fixing device 40) according to the first aspect, the extending portion (e.g., the extending portion 48*c*) is continuous and integrated with the pressure receiving portion (e.g., the pressure receiving portion 48*b*).

Third Aspect

In a third aspect, in the fixing device (e.g., the fixing device 40) according to the first or second aspect, the oner or more of the members disposed inside the loop of the fixing member (e.g., the fixing belt 42) include a stay (e.g., the fixing stay 44) that receives pressure from the pressing member (e.g., the pressing roller 41).

Fourth Aspect

In a fourth aspect, in the fixing device (e.g., the fixing device 40) according to any one of the first to third aspects, the one or more of the members disposed inside the loop of the fixing member (e.g., the fixing belt 42) include the fixing member.

Fifth Aspect

In a fifth aspect, the fixing device (e.g., the fixing device 40) according to any one of the first to fourth aspects includes a sliding member (e.g., the heat equalizing member 45*a*, the graphene 45*c*) having a higher slidability against the inner circumferential surface of the fixing member (e.g., the fixing belt 42) than a slidability of the pressure receiving portion (e.g., the pressure receiving portion 48*b*) against the inner circumferential surface of the fixing member. The pressure receiving portion abuts the inner circumferential surface of the fixing member via the sliding member.

Sixth Aspect

In a sixth aspect, the fixing device (e.g., the fixing device 40) according to the fifth aspect includes a nip forming member (e.g., a nip forming member 45) disposed inside the loop of the fixing member. The nip forming member includes a pad (e.g., the resin pad 45*b*) formed of resin. The extending portion (e.g., the extending portion 48*c*) is sandwiched between the sliding member (e.g., the heat equalizing member 45*a*, the graphene 45*c*) and the pad.

Seventh Aspect

In a seventh aspect, the fixing device (e.g., the fixing device 40) according to any one of the first to sixth aspects has a gap between the fixing member (e.g., the fixing belt 42) and the reflecting member (e.g., the reflector 48) in a state where the reflecting member is heated by the heat source (e.g., the heat source 43) and a maximum deformation amount is generated in the reflecting member.

Eighth Aspect

In an eighth aspect, the fixing device (e.g., the fixing device 40) according to any one of the first to seventh aspects includes a liquid or semi-solid volatile substance.

Ninth Aspect

In a ninth aspect, the fixing device (e.g., the fixing device 40) according to any one of the first to eighth aspect includes a supporting member (e.g., a flange 50) that rotatably supports the fixing member (e.g., the fixing belt 42). The reflecting member (e.g., the reflector 48) is in non-contact with the supporting member at least when the fixing member rotates.

Tenth Aspect

In a tenth aspect, an image forming apparatus (e.g., the image forming apparatus 1) includes the fixing device (e.g., the fixing device 40) according to any one of the first to ninth aspects.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

The invention claimed is:

1. A fixing device comprising:

a fixing belt that is rotatable;

a pressing roller to press and contact an outer circumferential surface of the fixing belt to form a nip portion;

a heat source disposed inside a loop of the fixing belt; and a reflector includes:

a reflecting portion to reflect heat, which is radiated from the heat source to at least a portion of the fixing belt, toward an inner circumferential surface of the fixing belt;

a pressure receiving portion to receive a pressing force of the pressing roller via the fixing belt; and an extending portion extending at least from an area upstream from the nip portion to an area downstream from the nip portion in a direction of rotation of the fixing belt and facing the inner circumferential surface of the fixing belt, the reflector to be in non-contact with one or more of structures disposed inside the loop of the fixing belt, at least when the fixing belt rotates, wherein the reflector is disposed around and in non-contact with an outer periphery of a stay.

2. The fixing device according to claim 1, wherein the member is in non-contact with the fixing belt at least when the fixing belt rotates.

3. The fixing device according to claim 1, further comprising a slider having a higher slidability against the inner circumferential surface of the fixing belt than a slidability of the pressure receiving portion against the inner circumferential surface of the fixing belt, wherein the pressure receiving portion abuts the inner circumferential surface of the fixing belt via the slider.

4. The fixing device according to claim 3, further comprising a nip forming structure disposed inside the loop of the fixing belt to form the nip portion, wherein the nip forming structure includes a resin pad, wherein the extending portion is sandwiched between the slider and the resin pad.

5. The fixing device according to claim 1, wherein the fixing device has a gap between the fixing belt and the reflector in a state where the reflector is heated by the heat source and a maximum deformation amount is generated in the reflector.

6. The fixing device according to claim 1, further comprising a liquid or semi-solid volatile substance stored in the fixing device.

7. The fixing device according to claim 1, further comprising a support rotatably supporting the fixing belt, wherein the reflector is in non-contact with the support at least when the fixing belt rotates.

8. An image forming device comprising the fixing device according to claim 1.

9. A fixing device comprising:

a fixing belt that is rotatable;

a pressing roller to press and contact an outer circumferential surface of the fixing belt to form a nip portion;

a heat source disposed inside a loop of the fixing belt; and a reflector includes:

a reflecting portion to reflect heat, which is radiated from the heat source to at least a portion of the fixing belt toward an inner circumferential surface of the fixing belt;

a pressure receiving portion to receive a pressing force of the pressing roller via the fixing belt; and an extending portion extending at least from an area upstream from the nip portion to an area downstream from the nip portion in a direction of rotation of the fixing belt and facing the inner circumferential surface of the fixing belt, the reflector to be in non-contact with one or more of structures disposed inside the loop of the fixing belt, at least when the fixing belt rotates, wherein the extending portion is continuous and integrated with the pressure receiving portion.

10. A fixing device comprising:

a fixing belt that is rotatable;

a pressing roller to press and contact an outer circumferential surface of the fixing belt to form a nip portion;

a heat source disposed inside a loop of the fixing belt; and a reflector includes:

a reflecting portion to reflect heat, which is radiated from the heat source to at least a portion of the fixing belt r toward an inner circumferential surface of the fixing belt;

a pressure receiving portion to receive a pressing force of the pressing roller via the fixing belt; and an extending portion extending at least from an area upstream from the nip portion to an area downstream from the nip portion in a direction of rotation of the fixing belt and facing the inner circumferential surface of the fixing belt, the reflector to be in non-contact with one or more of structures disposed inside the loop of the fixing belt, at least when the fixing belt rotates, wherein the one or more of the structures disposed inside the loop of the fixing belt is a stay that receives pressure from the pressing roller.

* * * * *